(12) United States Patent
Gam et al.

(10) Patent No.: US 10,551,674 B2
(45) Date of Patent: Feb. 4, 2020

(54) OPTICAL FILM AND LIQUID CRYSTAL DISPLAY

(71) Applicants: SAMSUNG ELECTRONICS CO., LTD., Suwon-si, Gyeonggi-do (KR); SAMSUNG SDI CO., LTD., Yongin-si, Gyeonggi-do (KR)

(72) Inventors: Sangah Gam, Seoul (KR); Hyung Jun Kim, Suwon-si (KR); Hye Young Kong, Uijeongbu-si (KR); Jong Hoon Won, Yongin-si (KR); Myungsup Jung, Seongnam-si (KR); Jong Hyuk Eun, Yongin-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 221 days.

(21) Appl. No.: 15/211,373

(22) Filed: Jul. 15, 2016

(65) Prior Publication Data

US 2017/0153478 A1 Jun. 1, 2017

(30) Foreign Application Priority Data

Nov. 27, 2015 (KR) .................. 10-2015-0167893

(51) Int. Cl.
*G02F 1/13363* (2006.01)
*C08J 5/18* (2006.01)
*G02F 1/1335* (2006.01)

(52) U.S. Cl.
CPC ........... *G02F 1/13363* (2013.01); *C08J 5/18* (2013.01); *G02F 1/133528* (2013.01);
(Continued)

(58) Field of Classification Search
CPC .......... G02F 1/13363; G02F 1/133634; G02F 1/133528; G02F 2413/11;
(Continued)

(56) References Cited

U.S. PATENT DOCUMENTS 5,302,665 A * 4/1994 Mishima ................ C08L 25/02
525/71
7,619,706 B2 * 11/2009 Yano ................ G02F 1/133634
349/100
(Continued)

FOREIGN PATENT DOCUMENTS

| JP | 2010002723 A | 1/2010 |
| KR | 1020070024784 A | 3/2007 |
| KR | 1020100071255 A | 6/2010 |

*Primary Examiner* — Anthony J Frost
(74) *Attorney, Agent, or Firm* — Cantor Colburn LLP

(57) ABSTRACT

An optical film includes a polarizer, a uniaxially elongated film disposed on the polarizer, and a compensation film disposed on one side of the uniaxially elongated film. The polarizer includes a polymer having a glass transition temperature of greater than about 100° C. and including a structural unit derived from styrene or a styrene derivative. The compensation film has a refractive index satisfying Relationship Equations 1 and 2, the uniaxially elongated film has an in-plane retardation satisfying Relationship Equation 3 and a thickness retardation satisfying Relationship Equation 4, and the compensation film has an in-plane retardation satisfying Relationship Equation 5 and a thickness retardation satisfying Relationship Equation 6. A liquid crystal display including the optical film is also disclosed. Relationship Equations 1 to 6 are described in the detailed description.

20 Claims, 2 Drawing Sheets

(52) U.S. Cl.
CPC ..... *G02F 1/133634* (2013.01); *C08J 2325/14* (2013.01); *G02F 2001/133637* (2013.01); *G02F 2413/11* (2013.01); *Y10T 428/10* (2015.01); *Y10T 428/1036* (2015.01)

(58) Field of Classification Search
CPC ..... G02F 2001/133637; G02F 2413/06; G02F 2413/02; C08J 5/18; C08J 2325/14; Y10T 428/10; Y10T 428/1036
See application file for complete search history.

(56) References Cited

U.S. PATENT DOCUMENTS

| | | | | |
|---|---|---|---|---|
| 2007/0172606 A1* | 7/2007 | Shunsuke | .............. | G02B 5/305 428/1.31 |
| 2009/0086318 A1* | 4/2009 | Yaegashi | ................ | B32B 37/12 359/485.01 |

* cited by examiner

OPTICAL FILM AND LIQUID CRYSTAL DISPLAY

CROSS-REFERENCE TO RELATED APPLICATION

This application claims priority to and the benefit of Korean Patent Application No. 10-2015-0167893 filed on Nov. 27, 2015, and all the benefits accruing therefrom under 35 U.S.C. § 119, the content of which in its entirety is herein incorporated by reference.

BACKGROUND

1. Field

The following description relates to an optical film and a liquid crystal display including the optical film.

2. Description of the Related Art

Commonly used flat panel displays may be classified into a light-emitting display device capable of emitting light by itself and a non-emissive display device requiring a separate light source. An optical film is frequently employed for improving the image quality of the light-emitting display device.

One type of light-receiving display device is a liquid crystal display (LCD). Light retardation in a LCD occurs due to a birefringence effect of the liquid crystals when an electric field is applied thereto. To minimize the birefringence of the liquid crystals, an optical film for compensating the retardation may be used.

SUMMARY

One embodiment provides an optical film capable of improving the visibility of a display device.

Another embodiment provides a display device including the optical film.

Yet another embodiment provides a liquid crystal display (LCD) including the optical film.

According to one embodiment, an optical film includes a polarizer, a uniaxially elongated film disposed on the polarizer and including a polymer having a glass transition temperature of greater than about 100° C. and including a structural unit derived from styrene or a styrene derivative, and a compensation film disposed on the uniaxially elongated film and having a refractive index satisfying Relationship Equations 1 and 2, wherein the uniaxially elongated film has an in-plate retardation satisfying Relationship Equation 3 and a thickness direction retardation satisfying Relationship Equation 4, and the compensation film has an in-plane retardation satisfying Relationship Equation 5 and a thickness direction retardation satisfying Relationship Equation 6.

$n_{x2} > n_{z2}$  Relationship Equation 1

$n_{y2} > n_{z2}$  Relationship Equation 2

In Relationship Equations 1 and 2, $n_{x2}$ is a refractive index at a slow axis of the compensation film, $n_{y2}$ is a refractive index at a fast axis of the compensation film, and $n_{z2}$ is a refractive index in a direction perpendicular to the slow axis and the fast axis of the compensation film;

110 nm ≤ $R_{o1}$(550 nm) < 180 nm  Relationship Equation 3

−100 nm ≤ $R_{th1}$(550 nm) < −20 nm  Relationship Equation 4

In Relationship Equations 3 and 4, $R_{o1}$ (550 nm) is in-plane retardation of the uniaxially elongated film at a 550 nm wavelength, and $R_{th1}$ (550 nm) is a thickness direction retardation of the uniaxially elongated film at a 550 nm wavelength;

−10 nm ≤ $R_{o2}$(550 nm) ≤ 10 nm  Relationship Equation 5

30 nm ≤ $R_{th2}$(550 nm) < 110 nm  Relationship Equation 6

In Relationships Equations 5 and 6, $R_{o2}$ (550 nm) is an in-plane retardation of the compensation film at a 550 nm wavelength, and $R_{th2}$ (550 nm) is a thickness direction retardation of the compensation film at a 550 nm wavelength.

The uniaxially elongated film may have a refractive index satisfying Relationship Equation 7.

$n_{y1} < n_{x1} = n_{z1}$  Relationship Equation 7

In Relationship Equation 7, $n_{x1}$ is a refractive index at a slow axis of the uniaxially elongated film, $n_{y1}$ is a refractive index at a fast axis of the uniaxially elongated film, and $n_{z1}$ is a refractive index in a direction perpendicular to the slow axis and the fast axis of the uniaxially elongated film.

The styrene derivative includes a substituted or unsubstituted C1 to C20 alkyl styrene, a substituted or unsubstituted C6 to C20 aryl styrene, a halogenated styrene, a substituted or unsubstituted C1 to C5 alkoxy styrene, a substituted or unsubstituted nitro styrene, a substituted or unsubstituted amino styrene, a substituted or unsubstituted carboxyl styrene, a substituted or unsubstituted C1 to C6 carbonyl styrene, or a combination thereof.

The polymer may further include a structural unit derived from maleimide, maleic anhydride, (meth)acrylonitrile, acrylonitrile, a derivative thereof, or a combination thereof.

The polymer may further include a structural unit derived from a (meth)acrylate or a derivative thereof.

The polymer may be a terpolymer consisting essentially of a structural unit derived from styrene or a styrene derivative, a structural unit derived from maleimide, maleic anhydride, (meth)acrylonitrile, acrylonitrile, or a derivative thereof, and a structural unit derived from a (meth)acrylate or a derivative thereof.

The polymer may have a glass transition temperature of about 110° C. to about 150° C.

The uniaxially elongated film may be uniaxially elongated about 1.1 times to about 5.0 times.

In-plane retardation ($R_{o1}$) of the uniaxially elongated film at 450 nm, 550 nm, and 650 nm wavelengths may satisfy Relationship Equation 8 or Relationship Equation 9.

$R_{o1}$(450 nm) > $R_{o1}$(550 nm) ≥ $R_{o1}$(650 nm)  Relationship Equation 8

$R_{o1}$(450 nm) ≥ $R_{o1}$(550 nm) > $R_{o1}$(650 nm)  Relationship Equation 9

In Relationship Equations 8 and 9, $R_{o1}$ (450 nm) is in-plane retardation of the uniaxially elongated film at a 450 nm wavelength, $R_{o1}$ (550 nm) is in-plane retardation of the uniaxially elongated film at a 550 nm wavelength, and $R_{o1}$ (650 nm) is in-plane retardation of the uniaxially elongated film at a 650 nm wavelength.

According to another embodiment, a display device including the optical film is provided.

According to another embodiment, a liquid crystal display includes a light source, a liquid crystal display panel disposed on the light source, and an optical film disposed on the liquid crystal display panel, wherein the optical film includes a first polarizer, a uniaxially elongated film disposed under the first polarizer and including a polymer having a glass transition temperature of greater than about 100° C. and including a structural unit derived from styrene or a styrene derivative, and a compensation film disposed under the uniaxially elongated film and having a refractive index satisfying Relationship Equations 1 and 2, wherein the uniaxially elongated film has an in-plane retardation satisfying Relationship Equation 3 and a thickness direction retardation satisfying Relationship Equation 4, and the compensation film has an in-plane retardation of Relationship Equations 5 and 6.

$$n_{x2} > n_{z2} \quad \text{Relationship Equation 1}$$

$$n_{y2} > n_{z2} \quad \text{Relationship Equation 2}$$

In Relationship Equations 1 and 2, $n_{x2}$ is a refractive index at a slow axis of the compensation film, $n_{y2}$ is a refractive index at a fast axis of the compensation film, and $n_{z2}$ is a refractive index in a direction perpendicular to the slow axis and the fast axis of the compensation film;

$$110 \text{ nm} \leq R_{o1}(550 \text{ nm}) < 180 \text{ nm} \quad \text{Relationship Equation 3}$$

$$-100 \text{ nm} \leq R_{th1}(550 \text{ nm}) < -20 \text{ nm} \quad \text{Relationship Equation 4}$$

In Relationship Equations 3 and 4, $R_{o1}$ (550 nm) is an in-plane retardation of the uniaxially elongated film at a 550 nm wavelength, and $R_{th1}$ (550 nm) is a thickness direction retardation of the uniaxially elongated film at a 550 nm wavelength;

$$-10 \text{ nm} \leq R_{o2}(550 \text{ nm}) \leq 10 \text{ nm} \quad \text{Relationship Equation 5}$$

$$30 \text{ nm} \leq R_{th2}(550 \text{ nm}) < 110 \text{ nm} \quad \text{Relationship Equation 6}$$

In Relationships Equations 5 and 6, $R_{o2}$ (550 nm) is an in-plane retardation of the compensation film at a 550 nm wavelength, and $R_{th2}$ (550 nm) is a thickness direction retardation of the compensation film at a 550 nm wavelength.

The uniaxially elongated film may have a refractive index satisfying Relationship Equation 7.

$$ny_1 < nx_1 = nz_1 \quad \text{Relationship Equation 7}$$

In Relationship Equation 7, $n_{x1}$ is a refractive index at a slow axis of the uniaxially elongated film, $n_{y1}$ is a refractive index at a fast axis of the uniaxially elongated film, and $n_{z1}$ is a refractive index in a direction perpendicular to the slow axis and the fast axis of the uniaxially elongated film.

The styrene derivative may include a substituted or unsubstituted C1 to C20 alkyl styrene, a substituted or unsubstituted C6 to C20 aryl styrene, a halogenated styrene, a substituted or unsubstituted C1 to C5 alkoxy styrene, a substituted or unsubstituted nitro styrene, a substituted or unsubstituted amino styrene, a substituted or unsubstituted carboxyl styrene, a substituted or unsubstituted C1 to C6 carbonyl styrene, or a combination thereof.

The polymer may further include a structural unit derived from maleimide, maleic anhydride, (meth)acrylonitrile, acrylonitrile, a derivative thereof, or a combination thereof.

The polymer may further include a structural unit derived from a (meth)acrylate or a derivative thereof.

The polymer may be a terpolymer consisting essentially of a structural unit derived from styrene or a styrene derivative, a structural unit derived from maleimide, maleic anhydride, (meth)acrylonitrile, acrylonitrile, or a derivative thereof, and a structural unit derived from a (meth)acrylate or a derivative thereof.

The polymer may have a glass transition temperature of about 110° C. to about 150° C.

The in-plane retardation ($R_{o1}$) of the uniaxially elongated film at 450 nm, 550 nm, and 650 nm wavelengths may satisfy Relationship Equation 8 or Relationship Equation 9.

$$R_{o1}(450 \text{ nm}) > R_{o1}(550 \text{ nm}) \geq R_{o1}(650 \text{ nm}) \quad \text{Relationship Equation 8}$$

$$R_{o1}(450 \text{ nm}) \geq R_{o1}(550 \text{ nm}) > R_{o1}(650 \text{ nm}) \quad \text{Relationship Equation 9}$$

In Relationship Equations 8 and 9, $R_{o1}$ (450 nm) is in-plane retardation of the uniaxially elongated film at a 450 nm wavelength, $R_{o1}$ (550 nm) is in-plane retardation of the uniaxially elongated film at a 550 nm wavelength, and $R_{o1}$ (650 nm) is in-plane retardation of the uniaxially elongated film at a 650 nm wavelength.

The liquid crystal display may further include a second polarizer interposed between the light source and the liquid crystal panel.

The liquid crystal display panel may include a pair of display panels facing each other, and a liquid crystal layer disposed between the pair of display panels and including liquid crystals rotated in an in-plane direction of the display panel in the presence of an electric field.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
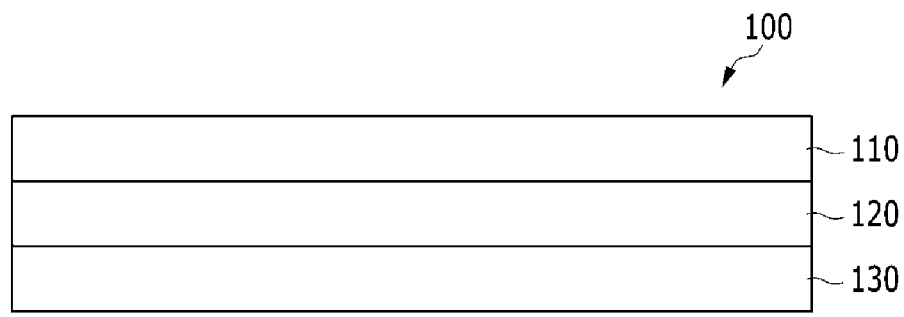
FIG. 1 is a schematic cross-sectional view illustrating an optical film according to one embodiment.

Exemplary embodiments of the present invention will hereinafter be described in detail, and may be easily performed by those who have common knowledge in the related art. However, this disclosure may be embodied in many different forms, and is not construed as limited to the exemplary embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. On the contrary, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, unless otherwise provided, the term "substituted" refers to a group substituted with a halogen (F, Br, Cl, or I), a hydroxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof.

Hereinafter, an optical film according to one embodiment is described referring to drawings.

FIG. 1 is a schematic cross-sectional view illustrating an optical film according to one embodiment.

Referring to FIG. 1, an optical film 100 according to one embodiment includes a polarizer 110, a uniaxially elongated film 120, and a compensation film 130.

The polarizer 110 may be, for example, an elongated film. The polarizer 110 may be a polarizing film including a polymer and a dichroic dye. The polymer may be, for example, a hydrophobic polymer and include, for example, polyolefin.

The polarizer 110 is not particularly limited if incident unpolarized light is to be polarized and may be, for example, a polyvinyl alcohol (PVA) including an iodine and/or a dichroic dye.

The uniaxially elongated film 120 may be an anisotropic polymer film elongated in a uniaxial direction.

The uniaxially elongated film 120 may include, for example, a polymer having negative birefringence.

The polymer may include, for example a structural unit derived from styrene or a styrene derivative. The structural unit derived from styrene or a styrene derivative may be, for example a structural unit derived from styrene, a substituted or unsubstituted alkyl styrene, a substituted or unsubstituted aryl styrene, a halogenated styrene, a substituted or unsubstituted alkoxy styrene, a substituted or unsubstituted nitro styrene, a substituted or unsubstituted amino styrene, a substituted or unsubstituted carboxyl styrene, a substituted or unsubstituted carbonyl styrene or a combination thereof, but is not limited thereto. For example, the structural unit derived from styrene or a styrene derivative may be a structural unit derived from a substituted or unsubstituted C1 to C20 alkyl styrene, a substituted or unsubstituted C6 to C20 aryl styrene, styrene substituted with one or two halogen elements, a substituted or unsubstituted C1 to C5 alkoxy styrene, a substituted or unsubstituted nitro styrene, a substituted or unsubstituted amino styrene, a substituted or unsubstituted carboxyl styrene, a substituted or unsubstituted C1 to C6 carbonyl styrene or a combination thereof, but is not limited thereto.

The polymer may further include, for example a structural unit derived from maleimide, maleic anhydride, (meth)acrylonitrile, acrylonitrile, a derivative thereof or a combination thereof.

The structural unit derived from maleimide may be, for example, a structural unit derived from maleimide, a substituted or unsubstituted alkyl maleimide, a substituted or unsubstituted cycloalkyl maleimide, a substituted or unsubstituted aryl maleimide or a combination thereof. For example, the structural unit may be derived from a substituted or unsubstituted C1 to C20 alkyl maleimide, a substituted or unsubstituted C3 to C20 cycloalkyl maleimide, a substituted or unsubstituted C6 to C20 aryl maleimide, or a combination thereof.

The structural unit derived from maleimide may be, for example a structural unit derived from an N-substituted maleimide, such as, for example, N-methylmaleimide, N-ethylmaleimide, N-isopropylmaleimide, N-butylmaleimide, N-isobutylmaleimide, N-t-butylmaleimide, N-n-hexylmaleimide, N-laurylmaleimide, N-cyclohexylmaleimide, N-phenylmaleimide, N-(2-methylphenyl)maleimide, N-(2-ethylphenyl)maleimide, N-(2-n-propylphenyl)maleimide, N-(2-isopropylphenyl)maleimide, N-(2,6-dimethylphenyl)maleimide, N-(2,6-diethylphenyl)maleimide, N-(2,6-diisopropylphenyl)maleimide, N-(2-chlorophenyl)maleimide, N-(2-bromophenyl)maleimide, N-(2-biphenyl)maleimide, N-(2-cyanophenyl)maleimide or a combination thereof, but is not limited thereto.

The polymer of the uniaxially elongated film 120, further including a structural unit derived from maleimide, maleic anhydride, (meth)acrylonitrile, acrylonitrile, a derivative thereof, or a combination thereof, may have a higher glass transition temperature, thereby improving heat resistance of the uniaxially elongated film.

The glass transition temperature (Tg) of the uniaxially elongated film 120 may be higher than about 100° C., for example, in a range of about 110° C. to about 150° C., and as a further example, in a range of about 120° C. to about 140° C.

The polymer may further include a structural unit derived from a (meth)acrylate or a derivative thereof.

The structural unit derived from a (meth)acrylate or a derivative thereof may be, for example, a structural unit derived from acrylate, methacrylate, hydroxyalkyl acrylate, hydroxyalkyl methacrylate, carboxyalkyl acrylate, carboxyalkyl methacrylate, acryloyloxyalkylsuccinic acid, (meth)acryloyloxyalkylsuccinic acid, acryloyloxyalkyl phthalic acid, (meth)acryloyloxyalkyl phthalic acid, or a combination thereof, but is not limited thereto.

The polymer may have, for example, a weight average molecular weight of about $5 \times 10^3$ to about $5 \times 10^6$. The polymer may have, for example a weight average molecular weight of about $5 \times 10^4$ to about $5 \times 10^6$.

In an embodiment, the polymer may be a terpolymer consisting essentially of a structural unit derived from styrene or a styrene derivative, a structural unit derived from maleimide, maleic anhydride, (meth)acrylonitrile, acrylonitrile, or a derivative thereof, and a structural unit derived from (meth)acrylate or a derivative thereof. In another embodiment, the terpolymer may consist of a structural unit derived from styrene or a styrene derivative, a structural unit derived from maleimide, maleic anhydride, (meth)acrylonitrile, acrylonitrile, or a derivative thereof, and a structural unit derived from (meth)acrylate or a derivative thereof.

The uniaxially elongated film 120 may be prepared by melt-extruding the above polymer into a sheet and elongating the sheet at a predetermined rate. The melt-extrusion may be performed at a temperature greater than or equal to the melting point of the polymer, for example, at a temperature of about 200° C. to about 350° C. The elongation may be performed in an uniaxial direction at a temperature greater than or equal to the glass transition temperature of the polymer. For example, the elongation may be performed at a temperature within a range of about ±50° C. of the glass transition temperature of the polymer.

The uniaxially elongated film 120 may be, for example, uniaxially elongated, about 1.1 times to about 5.0 times. As a further example, the uniaxially elongated film 120 may be elongated about 1.3 times to about 3.0 times.

The uniaxially elongated film 120 may have a refractive index satisfying Relationship Equation 7 by elongating the above polymer in a uniaxial direction.

$$n_{y1} < n_{x1} = n_{z1} \qquad \text{Relationship Equation 7}$$

In Relationship Equation 7, $n_{x1}$ is a refractive index at a slow axis of the uniaxially elongated film, $n_{y1}$ is a refractive index at a fast axis of the uniaxially elongated film, and $n_{z1}$ is a refractive index in a direction perpendicular to both the slow axis and the fast axis of the uniaxially elongated film.

In Relationship Equation 7, the $nx_1$ and $nz_1$ may be substantially equivalent or may be completely the same. Herein, $nx_1$ and $nz_1$ are considered to be substantially equivalent when the difference between the refractive index $nx_1$ and the refractive index $nz_1$ is less than or equal to about 10 nm and specifically, is less than or equal to about 5 nm.

The uniaxially elongated film 120 may have a retardation value.

The retardation value of the uniaxially elongated film 120 may be obtained as an in-plane retardation ($R_{o1}$) and as a thickness direction retardation ($R_{th1}$). The in-plane retardation ($R_{o1}$) of the uniaxially elongated film 120 occurs in an in-plane direction and may be expressed as $R_{o1} = (n_{x1} - n_{y1})d_1$. The thickness direction retardation ($R_{th1}$) of the uniaxially elongated film 120 occurs in a thickness direction and may be expressed as $R_{th1} = \{[(n_{x1} + n_{y1})/2] - n_{z1}\}d_1$. Herein, $d_1$ is a thickness of the uniaxially elongated film 120.

The uniaxially elongated film 120 may have an in-plane retardation and a thickness direction retardation within a predetermined range by changing the $n_{x1}$, $n_{y1}$, $n_{z1}$, and/or a thickness of $d_1$.

The uniaxially elongated film 120 may have an in-plane retardation satisfying Relationship Equation 3 and a thickness direction retardation satisfying Relationship Equation 4.

$$110 \text{ nm} \leq R_{o1}(550 \text{ nm}) < 180 \text{ nm} \qquad \text{Relationship Equation 3}$$

$$-100 \text{ nm} \leq R_{th1}(550 \text{ nm}) < -20 \text{ nm} \qquad \text{Relationship Equation 4}$$

In Relationship Equations 3 and 4, $R_{o1}$ (550 nm) is an in-plane retardation of the uniaxially elongated film at a 550 nm wavelength, and $R_{th1}$ (550 nm) is a thickness direction retardation of the uniaxially elongated film at a 550 nm wavelength.

The uniaxially elongated film 120, for example, may have an in-plane retardation and a thickness direction retardation satisfying Relationship Equations 3a and 4a, respectively.

$$120 \text{ nm} \leq R_{o1}(550 \text{ nm}) \leq 178 \text{ nm} \qquad \text{Relationship Equation 3a}$$

$$-100 \text{ nm} \leq R_{th1}(550 \text{ nm}) \leq -30 \text{ nm} \qquad \text{Relationship Equation 4a}$$

In Relationship Equations 3a and 4a, $R_{o1}$ (550 nm) is an in-plane retardation of the uniaxially elongated film at a 550 nm wavelength, and $R_{th1}$ (550 nm) is a thickness direction retardation of the uniaxially elongated film at 550 nm wavelength.

The uniaxially elongated film 120 may have a forward wavelength dispersion retardation or a reverse wavelength dispersion retardation. The forward wavelength dispersion retardation indicates that a retardation of light at a shorter wavelength is larger than a retardation of light at a longer wavelength, and the reverse wavelength dispersion retardation indicates that a retardation of light at a longer wavelength is larger than a retardation of light at a shorter wavelength.

For example, the uniaxially elongated film 120 may have the forward wavelength dispersion retardation, where, for example, the in-plane retardation ($R_{o1}$) of the uniaxially elongated film 120 at 450 nm, 550 nm and 650 nm wavelengths may satisfy Relationship Equation 8 or Relationship Equation 9.

$$R_{o1}(450\ nm) > R_{o1}(550\ nm) \geq R_{o1}(650\ nm) \quad \text{Relationship Equation 8}$$

$$R_{o1}(450\ nm) \geq R_{o1}(550\ nm) > R_{o1}(650\ nm) \quad \text{Relationship Equation 9}$$

In Relationship Equations 8 and 9, $R_{o1}$ (450 nm) is an in-plane retardation of the uniaxially elongated film at a 450 nm wavelength, $R_{o1}$ (550 nm) is an in-plane retardation of the uniaxially elongated film at a 550 nm wavelength, and $R_{o1}$ (650 nm) is an in-plane retardation of the uniaxially elongated film at a 650 nm wavelength.

The uniaxially elongated film 120 may have a thickness ranging from about 5 micrometers (μm) to about 100 μm. For example, the thickness may be in a range of about 10 μm to about 80 μm and specifically, may be in a range of about 10 μm to about 60 μm.

The compensation film 130 may be positioned on one side of the uniaxially elongated film 120 which is opposite to the polarizer 110 of the uniaxially elongated film 120.

The compensation film 130 may have a refractive index satisfying Relationship Equations 1 and 2.

$$n_{x2} > n_{z2} \quad \text{Relationship Equation 1}$$

$$n_{y2} > n_{z2} \quad \text{Relationship Equation 2}$$

In Relationship Equations 1 and 2, $n_{x2}$ is a refractive index at a slow axis of the compensation film, $n_{y2}$ is a refractive index at a fast axis of the compensation film, and $n_{z2}$ is a refractive index in a vertical direction with the slow axis and fast axis of the compensation film.

The optical film 100 includes the compensation film 130 having a refractive index satisfying Relationship Equations 1 and 2 and as a result, may perform a compensation function of reducing viewing angle dependency more effectively.

For example, the compensation film 130 may have a refractive index satisfying Relationship Equation 1a.

$$n_{x2} = n_{y2} > n_{z2} \quad \text{Relationship Equation 1a}$$

In Relationship Equation 1a, $n_{x2}$ and $n_{y2}$ may be completely the same or may be substantially equivalent. For example, $n_{x2}$ and $n_{y2}$ may be substantially equivalent when the difference between refractive index $nx_1$ and refractive index $n_{y2}$ is less than or equal to about 10 nm, and specifically, is less than or equal to about 5 nm.

The compensation film 130 has a refractive index satisfying Relationship Equation 1a and may also have substantial in-plane isotropy.

The compensation film 130 may have a retardation similar to the uniaxially elongated film 120. Herein, the in-plane retardation ($R_{o2}$) of the compensation film 130 may be expressed as $R_{o2} = (n_{x2} - n_{y2})d_2$, and the thickness direction retardation ($R_{th2}$) of the compensation film 130 may be expressed as $R_{th2} = \{[(n_{x2} + n_{y2})/2] - n_{z2}\}d_2$. Herein, $d_2$ is the thickness of the compensation film 130. The compensation film 130 may have an in-plane retardation and a thickness direction retardation within a predetermined range by changing $n_{x2}$, $n_{y2}$, $n_{z2}$, and/or $d_2$.

The compensation film 130 may have, for example, a retardation satisfying Relationship Equations 5 and 6.

$$-10\ nm \leq R_{o2}(550\ nm) \leq 10\ nm \quad \text{Relationship Equation 5}$$

$$30\ nm \leq R_{th2}(550\ nm) < 110\ nm \quad \text{Relationship Equation 6}$$

In Relationships Equations 5 and 6, $R_{o2}$ (550 nm) is in-plane retardation of the compensation film at a 550 nm wavelength, and $R_{th2}$ (550 nm) is thickness direction retardation of the compensation film at a 550 nm wavelength.

The compensation film 130 has a retardation satisfying Relationship Equations 5 and 6 and thus may reduce or offset a thickness direction retardation. Accordingly, the compensation film 130 may decrease the viewing angle dependency and further effectively perform a compensation function.

As an example, the compensation film 130 may have a retardation satisfying Relationship Equations 5a and/or 6a.

$$-5\ nm \leq R_{o2}(550\ nm) \leq 5\ nm \quad \text{Relationship Equation 5a}$$

$$50\ nm \leq R_{th2}(550\ nm) \leq 100\ nm \quad \text{Relationship Equation 6a}$$

As another example, the compensation film 130 may have a retardation satisfying Relationship Equations 5aa and/or 6aa.

$$0\ nm \leq R_{o2}(550\ nm) \leq 1\ nm \quad \text{Relationship Equation 5aa}$$

$$60\ nm \leq R_{th2}(550\ nm) \leq 100\ nm \quad \text{Relationship Equation 6aa}$$

The compensation film 130 may have a thickness ranging from about 5 μm to about 100 μm. The compensation film 130 may, for example, have a thickness ranging from about 10 μm to about 80 μm, and in another example, may have a thickness ranging from about 10 μm to about 60 μm range.

The polarizer 110, the uniaxially elongated film 120, and the compensation film 130 may contact each other and be bonded by an adhesive (not shown).

The degradation of optical properties due to heat generated during the process and/or the operation of the optical film 100, may be prevented or suppressed by reinforcing the heat resistance of the optical film with a polymer having a high glass transition temperature.

In addition, since the optical film 100 may be prepared through a process such as melt-extrusion, the process may be simplified and the manufacturing cost and unit price reduced. This is unlike a conventional protection film such as triacetyl cellulose (TAC).

The optical film 100 is disposed at one side or both sides of a display device and may perform a polarizing function to which a compensation function is added. In particular, the optical film is disposed at one side of a liquid crystal display (LCD) and compensates for the retardation of a liquid crystal layer. The optical film 100 thus may increase a contrast ratio at the side direction of the liquid crystal display and also, decrease a color shift and thus improve visibility.

Hereinafter, a liquid crystal display (LCD) is described as one example of the display device.

Figure 2:
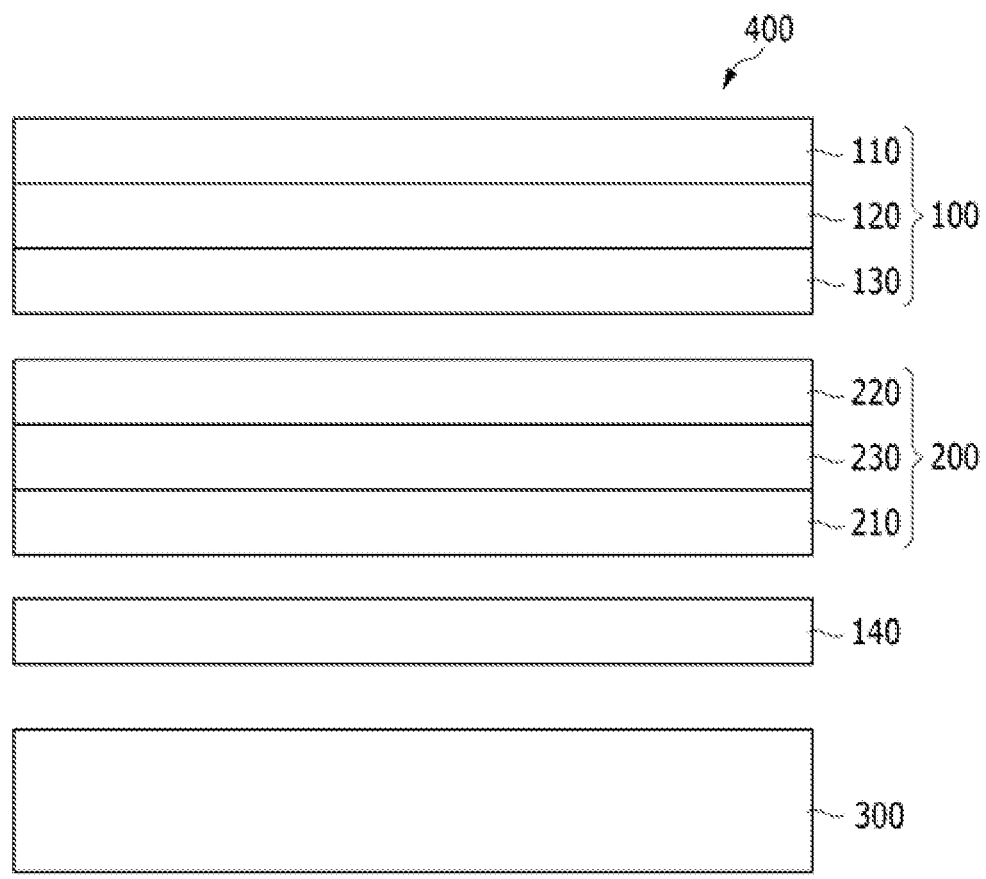
FIG. 2 is a cross-sectional view schematically illustrating a liquid crystal display according to one embodiment.

FIG. 2 is a cross-sectional view schematically showing a liquid crystal display according to one embodiment.

Referring to FIG. 2, a liquid crystal display (LCD) 400 according to one embodiment includes a light source member 300, a lower polarizer 140, a liquid crystal display panel 200, and the optical film 100.

The light source member 300 may include a light source supplying light and optionally, an optical sheet. The light source may be, for example, a cold cathode fluorescent lamp (CCFL), a light emitting diode (LED), a quantum dot (QD), and/or the like, and the optical sheet may be for example a prism sheet, a diffuser sheet, a light guide, and/or the like.

The lower polarizer 140 may be a film including, for example, a polyvinyl alcohol (PVA) including iodine and/or a dichroic dye. The lower polarizer 140 may be an elongated film. The lower polarizer 140 may include, for example, a layer formed of polyvinyl alcohol and at least one protective layer such as TAC. The lower polarizer 140 may be for example a polarizing film including a polymer and a dichroic dye. The polymer may be for example a hydrophobic polymer and include for example polyolefin.

The liquid crystal display panel 200 includes a first display panel 210, a second display panel 220, and a liquid crystal layer 230 disposed between the first display panel 210 and the second display panel 220.

The first display panel 210 may include, for example, a thin film transistor (not shown) formed on a substrate (not shown), a first field generating electrode (not shown) connected thereto, and a second field generating electrode (not shown) positioned apart from the first field generating electrode at a predetermined interval. Herein, an electric field may be applied in a horizontal direction to the first field generating electrode and the second field generating electrode.

The second display panel 220 may include a color filter (not shown) formed on the substrate (not shown). However, the present invention is not limited thereto, and the color filter may be included in the first display panel 210.

The liquid crystal layer 230 may include a plurality of liquid crystals. The liquid crystals may be arranged in a horizontal direction with the first and second display panels 210 and 220 and may be rotated in an in-plane direction of the first and second display panels 210 and 220 in the presence of an electric field, i.e. when an electric field is applied thereto.

The optical film 100 may be disposed on the liquid crystal panel 200, that is, at a viewer's side. The optical film 100 includes the polarizer 110, the uniaxially elongated film 120, and the compensation film 130 as described above.

The optical film 100 may perform both a polarizing function as well as a compensation function as described above. In particular, the optical film compensates for a birefringence effect of the liquid crystal layer 230 and thus improves a contrast ratio at the side direction of the liquid crystal display and reduces a color shift, thereby improving visibility.

In addition, the optical film 100 has heat resistance reinforced by including a polymer having a high glass transition temperature and thus may be prevented or suppressed from degradation of optical properties due to heat generated during the process of preparing the optical film and/or an operation using the optical film.

Hereinafter, the present disclosure is illustrated in more detail with reference to examples. However, these examples are exemplary, and the present disclosure is not limited thereto.

EXAMPLES

Manufacture of Uniaxially Elongated Film

Preparation Examples 1-1 to 7-1 and Comparative Preparation Examples 1-1 to 3-1

A poly(styrene-maleic anhydride-methylmethacrylate) terpolymer film (DENKA, Japan) (Tg=134° C.) is melt-extruded at about 250° C., elongated in a uniaxial direction (an elongation ratio of 1.3 to 2.6 times) at a temperature of 140° C. to 150° C., to obtain an uniaxially elongated film having the in-plane retardation ($R_{o1}$) and the thickness direction retardation ($R_{th1}$) shown in Table 1. The thickness of the uniaxially elongated film is about 20 μm.

The retardation of the uniaxially elongated films is measured as an in-plane retardation and a thickness direction retardation using Axoscan equipment (Axometrics, Inc.) at a wavelength ranging from 400 nm to 700 nm and adjusting the angle of incidence by 10° intervals from −40° to 40°.

TABLE 1

| | Elongation temperature and elongation ratio | In-plane retardation ($R_{o1}$, nm) (@ 550 nm) | Thickness direction retardation ($R_{th1}$, nm) (@ 550 nm) |
|---|---|---|---|
| Preparation Example 1-1 | 140° C., 1.8 times | 143 | −71 |
| Preparation Example 2-1 | 140° C., 1.8 times | 143 | −71 |
| Preparation Example 3-1 | 140° C., 1.8 times | 143 | −71 |
| Preparation Example 4-1 | 140° C., 1.8 times | 143 | −71 |
| Preparation Example 5-1 | 140° C., 2.0 times | 159 | −79 |
| Preparation Example 6-1 | 150° C., 1.5 times | 120 | −60 |
| Preparation Example 7-1 | 140° C., 2.3 times | 177 | −88 |
| Comparative Preparation Example 1-1 | 150° C., 1.3 times | 100 | −50 |
| Comparative Preparation Example 2-1 | 140° C., 2.3 times | 180 | −90 |
| Comparative Preparation Example 3-1 | 140° C., 2.6 times | 200 | −100 |

Preparation of Compensation Film

Preparation Examples 1-2 to 7-2 and Comparative Preparation Examples 1-2 to 3-2

100 parts by weight of cellulose acetate having an acetylation degree of 60.6%(149 M, Eastman), 10 parts by weight of carbazole as retardation-improving additive (Sigma-Aldrich Co., Ltd.), 593.3 parts by weight of methylene chloride, and 65.9 parts by weight of methanol are put in a mixing tank, and then, the mixture is stirred until each component is completely dissolved. A dope solution obtained by dissolving each component is cast on a glass substrate and then dried at room temperature for greater than or equal to 12 hours, to manufacture a 60 μm-thick cellulose acetate film. The film is simultaneously biaxially-elongated (an elongation ratio of 1.1 to 3.0 times) at a temperature of 130 to 140° C., to manufacture a film having the thickness direction retardation ($R_{th}$) and the in-plane retardation ($R_{o2}$) shown in Table 2.

TABLE 2

| | Elongation temperature and elongation ratio (MD/TD) | In-plane retardation ($R_{o2}$, nm) (@ 550 nm) | Thickness direction retardation ($R_{th2}$, nm) (@ 550 nm) |
|---|---|---|---|
| Preparation Example 1-2 | 135° C., 1.4 times | 0 | 80 |
| Preparation Example 2-2 | 135° C., 1.3 times | 0 | 70 |
| Preparation Example 3-2 | 135° C., 1.25 times | 0 | 60 |
| Preparation Example 4-2 | 135° C., 1.6 times | 0 | 100 |
| Preparation Example 5-2 | 135° C., 1.4 times | 0 | 80 |
| Preparation Example 6-2 | 135° C., 1.3 times | 0 | 70 |
| Preparation Example 7-2 | 135° C., 1.6 times | 0 | 100 |
| Comparative Preparation Example 1-2 | 135° C., 1.1 times | 0 | 20 |
| Comparative Preparation Example 2-2 | 135° C., 1.8 times | 0 | 120 |
| Comparative Preparation Example 3-2 | 135° C., 2.0 times | 0 | 150 |

Comparative Preparation Example 4

A 60 μm-thick Z-TAC film (Fuji Film Co.) is rubbed in one direction for an orientation treatment, coated with +A plate liquid crystals ($n_x > n_y = n_z$, RMM141C, Merck & Co., Inc.), and dried in an oven at 60° C. for 1 minute to remove residual solvent. Subsequently, the liquid crystals are photo cross-linked by radiating an ultraviolet (UV) ray having an intensity of 80 mW/cm$^2$ for 30 seconds in a container charged with nitrogen, preparing a λ/4 phase delay layer having an in-plane retardation of 143 nm and a thickness direction retardation of 70 nm. After coating an adhesive (PS-47, Soken Chemical & Engineering Co., Ltd.) on a glass substrate, the λ/4 phase delay layer is transferred on the adhesive, while a Z-TAC film is removed, preparing a liquid crystal film.

Manufacture of Optical Film

Example 1

A polyvinylalcohol film (PS 60, Kuraray Co., Ltd.) is elongated to be 25 μm thick, and the uniaxially elongated film of Preparation Example 1-1 and the compensation film of Preparation Example 1-2 are sequentially adhered on the elongated polyvinylalcohol film, manufacturing an optical film. The absorption axis of the polyvinyl alcohol film and the slow axis of the uniaxially elongated film of Preparation Example 1-1 are adhered parallel to each other.

Example 2

A polyvinylalcohol film (PS 60, Kuraray Co., Ltd.) is elongated to be 25 μm thick, and the uniaxially elongated film of Preparation Example 2-1 and the compensation film of Preparation Example 2-2 are sequentially adhered on the elongated polyvinyl alcohol film, manufacturing an optical film. The absorption axis of the polyvinyl alcohol film and the slow axis of the uniaxially elongated film of Preparation Example 2-1 are adhered parallel to each other.

Example 3

A polyvinylalcohol film (PS 60, Kuraray Co., Ltd.) is elongated to be 25 μm thick, and the uniaxially elongated film of Preparation Example 3-1 and the compensation film of Preparation Example 3-2 are sequentially adhered on the elongated polyvinyl alcohol film, manufacturing an optical film. The absorption axis of the polyvinyl alcohol film and the slow axis of the uniaxially elongated film of Preparation Example 3-1 are adhered parallel to each other.

Example 4

A polyvinylalcohol film (PS 60, Kuraray Co., Ltd.) is elongated to be 25 μm thick, and the uniaxially elongated film of Preparation Example 4-1 and the compensation film of Preparation Example 4-2 are sequentially adhered on the elongated polyvinyl alcohol film, manufacturing an optical film. The absorption axis of the polyvinyl alcohol film and the slow axis of the uniaxially elongated film of Preparation Example 4-1 are adhered parallel to each other.

Example 5

A polyvinylalcohol film (PS 60, Kuraray Co., Ltd.) is elongated to be 25 μm thick, and the uniaxially elongated film of Preparation Example 5-1 and the compensation film of Preparation Example 5-2 are sequentially adhered on the elongated polyvinyl alcohol film, manufacturing an optical film. The absorption axis of the polyvinyl alcohol film and the slow axis of the uniaxially elongated film of Preparation Example 5-1 are adhered parallel to each other.

Example 6

A polyvinylalcohol film (PS 60, Kuraray Co., Ltd.) is elongated to be 25 μm thick, and the uniaxially elongated film of Preparation Example 6-1 and the compensation film of Preparation Example 6-2 are sequentially adhered on the elongated polyvinyl alcohol film, manufacturing an optical film. The absorption axis of the polyvinyl alcohol film and the slow axis of the uniaxially elongated film of Preparation Example 6-1 are adhered parallel to each other.

Example 7

A polyvinylalcohol film (PS 60, Kuraray Co., Ltd.) is elongated to be 25 μm thick, and the uniaxially elongated film of Preparation Example 7-1 and the compensation film of Preparation Example 7-2 are sequentially adhered on the elongated polyvinyl alcohol film, manufacturing an optical film. The absorption axis of the polyvinyl alcohol film and the slow axis of the uniaxially elongated film of Preparation Example 7-1 are adhered parallel to each other.

Comparative Example 1

A polyvinylalcohol film (PS 60, Kuraray Co., Ltd.) is elongated to be 25 μm thick, and a TAC film (Fuji Film Co.) is attached on the elongated polyvinyl alcohol film, manufacturing an optical film.

Comparative Example 2

A polyvinylalcohol film (PS 60, Kuraray Co., Ltd.) is elongated to be 25 μm thick, and the uniaxially elongated film of Comparative Preparation Example 1-1 and the compensation film of Comparative Preparation Example 1-2 are sequentially adhered on the elongated polyvinyl alcohol film, manufacturing an optical film. The absorption axis of the polyvinyl alcohol film and the slow axis of the uniaxially elongated film of Comparative Preparation Example 1-1 are adhered parallel to each other.

Comparative Example 3

A polyvinylalcohol film (PS 60, Kuraray Co., Ltd.) is elongated to be 25 μm thick, and the uniaxially elongated film of Comparative Preparation Example 2-1 and the compensation film of Comparative Preparation Example 2-2 are sequentially adhered on the elongated polyvinyl alcohol film, manufacturing an optical film. The absorption axis of the polyvinyl alcohol film and the slow axis of the uniaxially elongated film of Comparative Preparation Example 2-1 are adhered parallel to each other.

Comparative Example 4

A polyvinylalcohol film (PS 60, Kuraray Co., Ltd.) is elongated to be 25 μm thick, and the uniaxially elongated film of Comparative Preparation Example 3-1 and the compensation film of Comparative Preparation Example 3-2 are sequentially adhered on the elongated polyvinyl alcohol film, manufacturing an optical film. The absorption axis of the polyvinyl alcohol film and the slow axis of the uniaxially elongated film of Comparative Preparation Example 3-1 are adhered parallel to each other.

Evaluation

Evaluation 1

The retardation of the uniaxially elongated film according to Preparation Example 1-1 is evaluated at different wavelengths.

The results are shown in Table 3.

TABLE 3

| Wavelength (nm) | In-plane retardation ($R_{o1}$, nm) | Thickness direction retardation ($R_{th1}$, nm) |
|---|---|---|
| 450 | 150.2 | −75.2 |
| 550 | 139.5 | −70.1 |
| 650 | 133.8 | −67.5 |

Evaluation 2

The reliability of the uniaxially elongated film of Preparation Example 1-1 and the liquid crystal film of Comparative Preparation Example 4 is evaluated. The uniaxially elongated film of Preparation Example 1-1 is adhered to one side of a glass substrate after applying an adhesive (PS-47, Soken Chemical & Engineering Co., Ltd.) thereon, similar to the liquid crystal film according to Comparative Preparation Example 4.

The reliability is evaluated by changing optical properties in a heat-resistant environment. Specifically, the uniaxially elongated film of Preparation Example 1-1 and the liquid crystal film of Comparative Preparation Example 4 are allowed to stand in an 85° C. chamber for 100 hours prior to examining their retardation changes ($\Delta R_o$).

The results are shown in Table 4.

TABLE 4

| | Changes of in-plane retardation ($\Delta R_{o1}$, nm) |
|---|---|
| Preparation Example 1-1 | −1.5 |
| Comparative Preparation Example 4 | −8.3 |

Referring to 4, the optical film according to Preparation Example 1-1 shows a small retardation change in a heat-resistant environment compared with the liquid crystal film according to Comparative Preparation Example 4. Accordingly, the uniaxially elongated film of Preparation Example 1-1 has higher reliability under high heat conditions (i.e. heat-resistant) as compared with the liquid crystal film of Comparative Preparation Example 4.

Evaluation 3

Contrast ratios at 0° (at a front direction) and 60° (at a side direction) are calculated by respectively applying the optical films according to Examples 1 to 7 and Comparative Example 1 to 4 to a liquid crystal display panel (PLS) in a coplanar electrode (CE) mode, manufacturing each liquid crystal display (LCD) by using the liquid crystal display panel (PLS), and using a Techwiz (Sanayi System Co., Ltd.) program.

A simulation is performed by stacking a LC-IPS liquid crystal layer, an isotropic protective layer, and a polyvinyl alcohol polarization film in order on one side of each optical film prepared according to Examples 1 to 7 and Comparative Examples 1 to 4. The absorption axes of upper and lower polarization films are set at 90° of each other.

The liquid crystal layer uses a conventional liquid crystal-in plane switching ("LC-IPS") of the Techwiz program, and the polyvinyl alcohol polarization film is set to have transmittance of about 42.7% and a polarization degree of about 99.9%.

The contrast ratio (CR) is expressed by the following equation.

$$CR = T_{Bright}/T_{Dark}$$ (Equation)

$T_{Bright}$: Transmittance in a bright state
$T_{Dark}$: Transmittance in a dark state
The results are shown in Table 5.

TABLE 5

| | Contrast ratio (Polar angle/Azimuth angle) | |
|---|---|---|
| | 0°/0° | 60°/45° |
| Example 1 | 3887 | 195 |
| Example 2 | 3887 | 171 |
| Example 3 | 3887 | 124 |
| Example 4 | 3887 | 133 |
| Example 5 | 3886 | 129 |
| Example 6 | 3886 | 77 |
| Example 7 | 3886 | 52 |
| Comparative Example 1 | 3886 | 16 |
| Comparative Example 2 | 3886 | 24 |
| Comparative Example 3 | 3886 | 26 |
| Comparative Example 4 | 3886 | 20 |

Referring to Table 5, the liquid crystal displays (LCD) of Examples 1 to 7 show a remarkably improved contrast ratio at the side direction compared with the liquid crystal displays (LCD) of Comparative Examples 1 to 4, while the liquid crystal displays (LCD) of Examples 1 to 7 and Comparative Examples 1 to 4 show an equivalent contrast ratio at the front direction. Accordingly, the retardation function of the liquid crystal displays (LCD) of Examples 1 to 7 may be reinforced.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical film comprising
a polarizer,
a uniaxially elongated film disposed directly on the polarizer and comprising a polymer, the polymer having a glass transition temperature of greater than about 100° C. and comprising a structural unit derived from styrene or a styrene derivative, and
a compensation film disposed on the uniaxially elongated film and having a refractive index satisfying Relationship Equations 1 and 2,
wherein the uniaxially elongated film has an in-plane retardation satisfying Relationship Equation 3 and a thickness direction retardation satisfying Relationship Equation 4, and the compensation film has an in-plane retardation satisfying Relationship Equation 5 and a thickness direction retardation satisfying Relationship Equation 6, and
wherein the optical film has a contrast ratio of greater than 26° as measured at a polar angle/azimuthal angle of 60°/45°:

$$n_{x2} > n_{z2} \quad \text{Relationship Equation 1}$$

$$n_{y2} > n_{z2} \quad \text{Relationship Equation 2}$$

wherein, in Relationship Equations 1 and 2,
$n_{x2}$ is a refractive index at a slow axis of the compensation film,
$n_{y2}$ is a refractive index at a fast axis of the compensation film, and
$n_{z2}$ is a refractive index in a direction perpendicular to the slow axis and the fast axis of the compensation film;

$$110 \text{ nm} \leq R_{o1}(550 \text{ nm}) < 180 \text{ nm} \quad \text{Relationship Equation 3}$$

$$-100 \text{ nm} \leq R_{th1}(550 \text{ nm}) \leq -20 \text{ nm} \quad \text{Relationship Equation 4}$$

wherein, in Relationship Equations 3 and 4,
$R_{o1}$ (550 nm) is in-plane retardation of the uniaxially elongated film at a 550 nm wavelength, and
$R_{th1}$ (550 nm) is thickness direction retardation of the uniaxially elongated film at a 550 nm wavelength;

$$-10 \text{ nm} \leq R_{o2}(550 \text{ nm}) \leq 10 \text{ nm} \quad \text{Relationship Equation 5}$$

$$30 \text{ nm} \leq R_{th2}(550 \text{ nm}) < 110 \text{ nm} \quad \text{Relationship Equation 6}$$

wherein, in Relationships Equations 5 and 6,
$R_{o2}$ (550 nm) is in-plane retardation of the compensation film at a 550 nm wavelength, and
$R_{th2}$ (550 nm) is thickness direction retardation of the compensation film at a 550 nm wavelength.

2. The optical film of claim 1, wherein the uniaxially elongated film has a refractive index satisfying Relationship Equation 7:

$$n_{y1} < n_{x1} = n_{z1} \quad \text{Relationship Equation 7}$$

wherein, in Relationship Equation 7,
$n_{x1}$ is a refractive index at a slow axis of the uniaxially elongated film,
$n_{y1}$ is a refractive index at a fast axis of the uniaxially elongated film, and
$n_{z1}$ is a refractive index in a direction perpendicular to the slow axis and the fast axis of the uniaxially elongated film.

3. The optical film of claim 1, wherein the styrene derivative comprises a substituted or unsubstituted C1 to C20 alkyl styrene, a substituted or unsubstituted C6 to C20 aryl styrene, a halogenated styrene, a substituted or unsubstituted C1 to C5 alkoxy styrene, a substituted or unsubstituted nitro styrene, a substituted or unsubstituted amino styrene, a substituted or unsubstituted carboxyl styrene, a substituted or unsubstituted C1 to C6 carbonyl styrene, or a combination thereof.

4. The optical film of claim 1, wherein the polymer further comprises a structural unit derived from maleimide, maleic anhydride, (meth)acrylonitrile, acrylonitrile, a derivative thereof, or a combination thereof.

5. The optical film of claim 4, wherein the polymer further comprises a structural unit derived from a (meth)acrylate or a derivative thereof.

6. The optical film of claim 1, wherein the polymer is a terpolymer consisting essentially of
a structural unit derived from styrene or a styrene derivative,
a structural unit derived from maleimide, maleic anhydride, (meth)acrylonitrile, acrylonitrile, or a derivative thereof, and
a structural unit derived from a (meth)acrylate or a derivative thereof.

7. The optical film of claim 1, wherein the polymer has a glass transition temperature of about 110° C. to about 150° C.

8. The optical film of claim 1, wherein the uniaxially elongated film is uniaxially elongated about 1.1 times to about 5.0 times.

9. The optical film of claim 1, wherein in-plane retardation ($R_{o1}$) of the uniaxially elongated film at 450 nm, 550 nm, and 650 nm wavelengths satisfies Relationship Equation 8 or Relationship Equation 9:

$$R_{o1}(450 \text{ nm}) > R_{o1}(550 \text{ nm}) \geq R_{o1}(650 \text{ nm}) \quad \text{Relationship Equation 8}$$

$$R_{o1}(450 \text{ nm}) \geq R_{o1}(550 \text{ nm}) > R_{o1}(650 \text{ nm}) \quad \text{Relationship Equation 9}$$

wherein, in Relationship Equations 8 and 9,
$R_{o1}$ (450 nm) is in-plane retardation of the uniaxially elongated film at a 450 nm wavelength,
$R_{o1}$ (550 nm) is in-plane retardation of the uniaxially elongated film at a 550 nm wavelength, and
$R_{o1}$ (650 nm) is in-plane retardation of the uniaxially elongated film at a 650 nm wavelength.

10. A display device including the optical film of claim 1.

11. A liquid crystal display comprising
a light source,
a liquid crystal display panel disposed on the light source, and
an optical film disposed on the liquid crystal display panel,
wherein the optical film comprises
a first polarizer,
a uniaxially elongated film disposed directly under the first polarizer and comprising a polymer, the polymer having a glass transition temperature of greater than about 100° C. and comprising a structural unit derived from styrene or a styrene derivative, and
a compensation film disposed under the uniaxially elongated film and having a refractive index satisfying Relationship Equations 1 and 2,
wherein the uniaxially elongated film has an in-plane retardation satisfying Relationship Equation 3 and a thickness direction retardation satisfying Relationship Equation 4, and the compensation film has an in-plane retardation satisfying Relationship Equation 5 and a thickness direction retardation satisfying Relationship Equation 6 and wherein the liquid crystal display has a contrast ratio of greater than 26° as measured at a polar angle/azimuthal angle of 60°/45°:

$$n_{x2} > n_{z2} \qquad \text{Relationship Equation 1}$$

$$n_{y2} > n_{z2} \qquad \text{Relationship Equation 2}$$

wherein, in Relationship Equations 1 and 2,
- $n_{x2}$ is a refractive index at a slow axis of the compensation film,
- $n_{y2}$ is a refractive index at a fast axis of the compensation film, and
- $n_{z2}$ is a refractive index in a direction perpendicular to the slow axis and the fast axis of the compensation film;

$$110 \text{ nm} \leq R_{o1}(550 \text{ nm}) < 180 \text{ nm} \qquad \text{Relationship Equation 3}$$

$$-100 \text{ nm} \leq R_{th1}(550 \text{ nm}) < -20 \text{ nm} \qquad \text{Relationship Equation 4}$$

wherein, in Relationship Equations 3 and 4,
- $R_{o1}$ (550 nm) is in-plane retardation of the uniaxially elongated film at a 550 nm wavelength, and
- $R_{th1}$ (550 nm) is thickness direction retardation of the uniaxially elongated film at a 550 nm wavelength;

$$-10 \text{ nm} \leq R_{o2}(550 \text{ nm}) \leq 10 \text{ nm} \qquad \text{Relationship Equation 5}$$

$$30 \text{ nm} \leq R_{th2}(550 \text{ nm}) < 110 \text{ nm} \qquad \text{Relationship Equation 6}$$

wherein, in Relationships Equations 5 and 6,
- $R_{o2}$ (550 nm) is in-plane retardation of the compensation film at a 550 nm wavelength, and
- $R_{th2}$ (550 nm) is thickness direction retardation of the compensation film at a 550 nm wavelength.

12. The liquid crystal display of claim 11, wherein the uniaxially elongated film has a refractive index satisfying Relationship Equation 7:

$$n_{y1} < n_{x1} = n_{z1} \qquad \text{Relationship Equation 7}$$

wherein, in Relationship Equation 7,
- $n_{x1}$ is a refractive index at a slow axis of the uniaxially elongated film,
- $n_{y1}$ is a refractive index at a fast axis of the uniaxially elongated film, and
- $n_{z1}$ is a refractive index in a direction perpendicular to the slow axis and the fast axis of the uniaxially elongated film.

13. The liquid crystal display of claim 11, wherein the styrene derivative comprises a substituted or unsubstituted C1 to C20 alkyl styrene, a substituted or unsubstituted C6 to C20 aryl styrene, a halogenated styrene, a substituted or unsubstituted C1 to C5 alkoxy styrene, a substituted or unsubstituted nitro styrene, a substituted or unsubstituted amino styrene, a substituted or unsubstituted carboxyl styrene, a substituted or unsubstituted C1 to C6 carbonyl styrene or a combination thereof.

14. The liquid crystal display of claim 11, wherein the polymer further comprises a structural unit derived from maleimide, maleic anhydride, (meth)acrylonitrile, acrylonitrile, a derivative thereof, or a combination thereof.

15. The liquid crystal display of claim 14, wherein the polymer further comprises a structural unit derived from a (meth)acrylate or a derivative thereof.

16. The liquid crystal display of claim 11, wherein the polymer is a terpolymer consisting essentially of
- a structural unit derived from styrene or a styrene derivative,
- a structural unit derived from maleimide, maleic anhydride, (meth)acrylonitrile, acrylonitrile, or a derivative thereof, and
- a structural unit derived from (meth)acrylate or a derivative thereof.

17. The liquid crystal display of claim 11, wherein the polymer has a glass transition temperature of about 110° C. to about 150° C.

18. The liquid crystal display of claim 11, in-plane retardation ($R_{o1}$) of the uniaxially elongated film at 450 nm, 550 nm, and 650 nm wavelengths satisfies Relationship Equation 8 or Relationship Equation 9:

$$R_{o1}(450 \text{ nm}) > R_{o1}(550 \text{ nm}) \geq R_{o1}(650 \text{ nm}) \qquad \text{Relationship Equation 8}$$

$$R_{o1}(450 \text{ nm}) \geq R_{o1}(550 \text{ nm}) > R_{o1}(650 \text{ nm}) \qquad \text{Relationship Equation 9}$$

wherein, in Relationship Equations 8 and 9,
- $R_{o1}$ (450 nm) is in-plane retardation of the uniaxially elongated film at a 450 nm wavelength,
- $R_{o1}$ (550 nm) is in-plane retardation of the uniaxially elongated film at a 550 nm wavelength, and
- $R_{o1}$ (650 nm) is in-plane retardation of the uniaxially elongated film at a 650 nm wavelength.

19. The liquid crystal display of claim 11, further comprising a second polarizer interposed between the light source and the liquid crystal display panel.

20. The liquid crystal display of claim 11, wherein the liquid crystal display panel comprises:
- a pair of display panels facing each other, and
- a liquid crystal layer disposed between the pair of display panels and comprising liquid crystals rotated in an in-plane direction of the display panels when in the presence of an electric field.

* * * * *